(12) United States Patent
Raskin et al.

(10) Patent No.: US 10,372,020 B2
(45) Date of Patent: Aug. 6, 2019

(54) DUAL-FUNCTION LIGHTED WEARABLE ACCESSORY

(71) Applicant: iSquared Global, LLC, Simi Valley, CA (US)

(72) Inventors: Irena Raskin, Pacific Palisades, CA (US); Irena Hauser, Beverly Hills, CA (US); Samuel Kryszek, Beverly Hills, CA (US)

(*) Notice: Subject to any disclaimer, the term of this patent is extended or adjusted under 35 U.S.C. 154(b) by 95 days.

(21) Appl. No.: 15/610,141

(22) Filed: May 31, 2017

(65) Prior Publication Data

US 2017/0343888 A1 Nov. 30, 2017

Related U.S. Application Data

(60) Provisional application No. 62/343,822, filed on May 31, 2016.

(51) Int. Cl.
| | |
|---|---|
| G03B 15/00 | (2006.01) |
| G03B 15/06 | (2006.01) |
| G03B 15/02 | (2006.01) |
| G04B 47/00 | (2006.01) |

(52) U.S. Cl.
CPC ............. *G03B 15/06* (2013.01); *G03B 15/02* (2013.01); *G03B 2215/0517* (2013.01); *G04B 47/00* (2013.01)

(58) Field of Classification Search
CPC .. A41D 1/002; A41D 13/088; F21V 33/0008; F21W 2121/06

USPC .................................................. 362/570–571
See application file for complete search history.

(56) References Cited

U.S. PATENT DOCUMENTS

| 6,550,930 B1* | 4/2003 | Portouche | F21L 4/00 362/103 |
|---|---|---|---|
| 8,398,255 B2* | 3/2013 | Starogiannis | F21L 4/04 2/160 |
| 2011/0044031 A1* | 2/2011 | Zaksenberg | F21L 4/04 362/157 |
| 2014/0049946 A1* | 2/2014 | Schrimmer | F21V 33/0008 362/103 |

\* cited by examiner

*Primary Examiner* — Gerald J Sufleta, II
(74) *Attorney, Agent, or Firm* — Risso I.P.

(57) ABSTRACT

The present invention provides a novel lighting accessory, which has never been proposed before for increasing luminance when in one embodiment, a mobile electronic device is used in a low light environment for photography, videography or video conferencing. By disposing a lighting device in an accessory, when a user utilizes a common back camera on a mobile device to conduct video conferencing, the lighting device helps to illuminate the user's face and increase luminance. As for the user using a common front camera to do video or photo shooting, the lighting device helps to increase luminance of the subject and ambient environment, so that the video or photo shot performs at a high quality. The lighting device can be concealed in a novel reversible light housing that can also be used to conceal other wearable technology, such as fitness monitors, watch components, etc.

11 Claims, 12 Drawing Sheets

DUAL-FUNCTION LIGHTED WEARABLE ACCESSORY

CROSS-REFERENCE TO RELATED APPLICATIONS

The present application is a Non-Provisional Utility Patent Application of U.S. Provisional Application No. 62/343,822, filed on May 31, 2016, entitled, "Portable Photographic Lighting System."

BACKGROUND OF THE INVENTION

(1) Field of Invention

The present invention is related to a photographic lighting accessory and, more specifically, to a portable and body worn lighting accessory used to illuminate a subject for photographic or video capture.

(2) Description of Related Art

The present invention is generally directed to photography and lighting. As electronic technology developed, a variety of mobile electronic devices containing means for taking photographs or video clips have become available in today's market. For expanding their functionalities, most of the current mobile electronic and computer devices are generally equipped with dual cameras for both front and back photography and videography. For example, since most mobile devices feature a front and a back camera, a user can easily take photos through the front and the back camera of the mobile device, and can conduct video conferencing through the back camera of the mobile device.

However, it should be noted that when a mobile or portable device camera is used in low light or virtual darkness, or when a video conference is conducted in a low light environment, the variability of ambient light seriously impacts the quality of such photos or video conferences; as a result, a clear and fine photo or videography cannot be guaranteed. Also, due to the proximity of the mobile device to the face of the user, over-exposure, under-exposure, or emission of excessive light to the face and especially the eyes of the user at such close range are also common issues occurring in modern times when a mobile device's internal flash is generally the only added light source used.

When portable lighting systems were introduced for use as attachments to mobile phones, they proved cumbersome; having the light attachment in place causes mobile phones to lose their sleek designs, and as a result they suffer from a reduced ability (or complete inability) to fit into an average person's pockets, into most phone cases, or even into small purses. Moreover, putting the light attachment on and removing it proved cumbersome and virtually impossible to accomplish on immediate demand. It is important to note that the attachments produced significant heat and had only a short battery life, in addition to the fact that they had no ancillary or independent function. Furthermore, where an electrical outlet was unavailable, the existing portable lighting systems would draw power from the battery in the mobile device, thereby depleting the battery life and thus reliability and effectiveness of the mobile device. Additionally, mobile phone cases producing a light around the periphery of the mobile device were cumbersome, depleted the battery life of the mobile device, could not be used to take photos other than when using the mirror application of the device for selfies, and could not illuminate video of an object other than when using the mirror application of the device and the back camera.

Furthermore, the angle of the light and the angle of the photo or video were fixed and limited to the same angle as the two were attached when portable and not plugged into a typical stationary power outlet. Prior lighting systems that focused light only on objects to the back of the camera could not successfully be used in concert with the existing flash of most mobile devices as it functions only when the front camera is used. It is the object of the present invention to provide a light that overcomes the deficiencies of the prior art light sources.

Therefore, on account of the above, there is a continuing need for a novel accessory which can be used with different mobile devices securely, efficiently, effectively and conveniently in almost any low light environment such as a car, a dark room, a restaurant, a concert or event, at dusk or in a dark outdoor environment, etc. The accessory should be easily and quickly available to use with mobile and other devices for increasing luminance when the mobile device is used in a low light environment so as to obtain superior quality in both photography and videography (as well as a myriad of independent ancillary uses) while it is applied.

SUMMARY OF INVENTION

Certain embodiments of the present invention include but are not limited to the following. An aspect of the present invention is to provide a portable light source that can be used to illuminate a subject for photographic or video capture. The light is designed to be easily and stylishly transportable and to provide a bright but diffused illumination of the subject. Additionally, such light source may be incorporated into or concealed within everyday items normally worn by the subject, such as, but not limited to, jewelry, watches, clothing and other accessories.

The light of the present invention is designed so that it can be easily worn, hand held or easily mounted and placed on other holding structures such as a stand, a desktop computer or accessory. The light is designed to be powered independent of the subject it illuminates or of the camera or mobile device with which it is being used, instead drawing its power from batteries, power cells or other portable power sources of any nature, although rechargeable batteries such as lithium ion batteries are currently preferable. In fact, as battery storage technology improves, it is expected that the power source for the present invention could be used to provide charges for other electronic devices or components. The portability of the light and lack of necessity to attach it to any other device for power, or general use, as an example, allows the user to capture an image where the light can be held and used in tandem with the camera at virtually limitless different angles and perspectives both with and in contrast to the angle of the camera in the mobile device, depending what the subject would like to illuminate. The light is designed to be very compact, but at the same time extremely powerful, comfortable and stylish. The light incorporates the latest technology heat boards for LED lights which allow the LED lights to be placed closer together in a more compact area. The heat boards function to manage the heat produced by the LED lights allowing the LED lights to be positioned in close proximity to one another and to a person in a manner that has not previously been possible in lights that are used in photographic or video image capture. The close proximity of the LED lights also functions to greatly reduce shadows as the illumination from the light is very evenly distributed and powerful. The specialized coating functions to virtually eliminate the heat from the lights to the touch, making the light comfortable to wear.

In various embodiments, the wearable lighting accessory includes a light housing having a light emitting side; one or more lights housed within the light housing; electrical components electrically connected with the one or more lights to activate the one or more lights; a power source attached with the electrical components; and an activation switch attached with the light housing and operable for allowing a user to selectively activate the one or more lights.

In another aspect, a diffusion lens is attached with the light emitting side of the light housing and positioned proximate the one or more lights such that light emitted from the one or more lights passes through the diffusion lens.

In another aspect, one or more wrist bands are connected with the light housing.

In yet another aspect, a casing assembly is included for holding the light housing. The casing assembly is positioned between the light housing and the one or more wrist bands, and wherein the light housing is movably connected with the casing assembly such that the light housing can be positioned between a concealed configuration in which the light emitting side of the light housing is concealed and an exposed configuration in which the light emitting side is exposed to emit light from the one or more lights.

In another aspect, the casing assembly includes a cradle portion with a magnet connected with the cradle portion, and wherein the activation switch is a magnet switch positioned within the light housing such that when the light housing is in the exposed position, the magnet switch is positioned proximate the magnet in the cradle portion to actuate the magnet switch and activate the one or more lights.

In yet another aspect, the light housing includes components to provide a secondary function as viewable from a secondary function side of the light housing, such that when in the concealed configuration, the secondary function side is exposed and the light emitting side is concealed, and when in the exposed configuration, the light emitting side is exposed and the secondary function side is concealed.

In another aspect, the secondary function is a watch such that the secondary function side includes a watch face.

In yet another aspect, the one or more lights is comprised of one or more light emitting diodes (LEDs).

In another aspect, the light housing includes sides with pins protruding therefrom, and wherein the casing assembly includes interior walls with slots formed therein, such that the pins of the light housing slideably reside within the slots of the casing assembly, whereby a user can rotate up the light housing and slide the pins within the slots to selectively rest the light housing within the casing assembly in either the concealed or exposed configurations.

In yet another aspect, a pivot bracket is positioned between the light housing and casing assembly, such that the light housing is rotatably connected with the pivot bracket, and the pivot bracket is rotatably connected with the casing assembly, whereby a user can pivot the pivot bracket and light housing up and away from the casing assembly about a first pivot axis, and then spin the light housing about a second pivot axis into a desired configuration, at which point the light housing and pivot bracket can be pivoted back toward the casing assembly, allowing a user to selectively position the light housing between the concealed and exposed configurations.

Other objects and advantages of the present invention will become apparent to those skilled in the art upon a review of the following detailed description of the preferred embodiments and the accompanying drawings.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
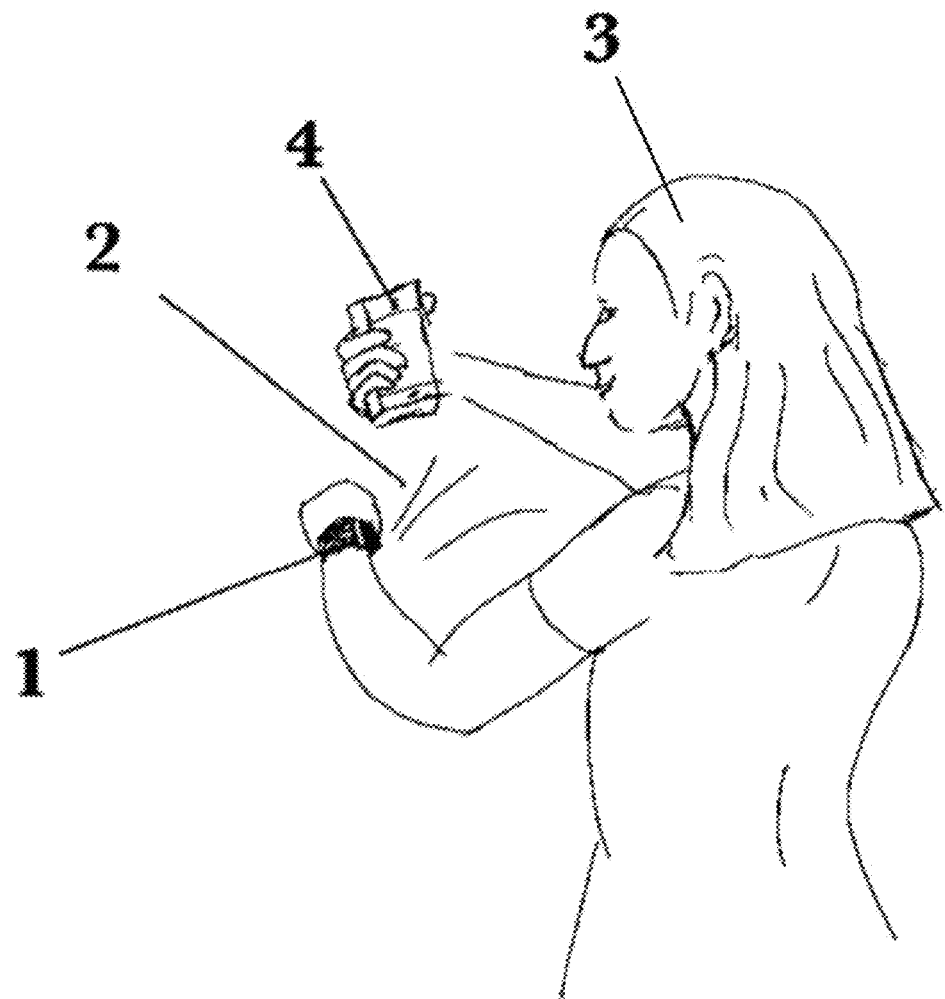
FIG. 1 is perspective-view illustration of a wearable lighting accessory as being worn by an individual and used with a mobile device in accordance with various embodiments of the present invention.

The present invention is related to a photographic lighting accessory and, more specifically, to a portable and body worn lighting accessory used to illuminate a subject for photographic or video capture. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Specific Details

The invention is directed to a light source that can be utilized for illuminating a subject when taking photographs and/or videos with photographic or video cameras, including but not limited to digital cameras that are incorporated into mobile phones, personal electronic devices, desktop and laptop computers or other similar electronic devices. Such a light source is desirable because the ambient light that is available to illuminate a subject when using mobile or portable electronic devices can be variable, and frequently is not adequate or does not produce the light characteristics that are desired by the individual capturing the image.

Thus, in addressing this issue, the invention is directed to a portable, rechargeable and wearable lighting accessory that can be used to illuminate a subject for a photographic or video capture. For portability, the wearable lighting accessor can be concealed, set, worn and/or incorporated into everyday items, such as clothing, a watch, purses, wallets, bags, jewelry, and other accessories, as well as specially designed items including but not limited to jewelry, clothing or other accessories. The light can be set into and worn as part of a piece of jewelry and combined with other jewelry pieces, clothing items and/or accessories to provide a bright but diffused illumination of the subject instantly upon activation of an on/off switch and/or a flip of the light housing holding the lighting unit. The flip or reversible feature of the light housing, which conceals the lighting unit, can also be used to conceal or hold other electronic wearable technology devices.

With the expanded inclusion of photographic and video conferencing capabilities in an ever-widening variety of mobile devices and portable electronic devices, and an increased reliance on such devices as a substitute for traditional photographic and video cameras, there is a need for a quickly-employed and easily-available lighting accessory for immediate and compact use when a photograph or video is shot, or a video conference conducted, in a low light environment as shown in FIG. 1. Due to the proximity of the hand-held or portable device 4 (e.g., mobile phone) to the face of the user 3 and the variability of ambient light, the present invention discloses a wearable lighting accessory 1 which can be worn (e.g., as a piece of jewelry, watch, etc.) and turned on to illuminate 2 a user 3 when a mobile phone or other portable device 4 is in use in low light. The wearable lighting accessory 1 of the present invention includes a light emitting side that is provided so as to increase luminance for the user 3 when a mobile phone or other portable electronic device 4 is employed for shooting a photo or video and/or for conducting a video conference in a low or variable light environment.

For achieving the above-mentioned objectives, the present invention provides a wearable lighting accessory 1, which can be used in concert with any mobile or personal electronic device 4 for increasing luminance 2 when such a device 4 is used in a low light environment, as shown in FIG. 1. For example, FIG. 1 shows a person (i.e., user 3) taking a "selfie" photograph in low light conditions with one hand and using the wearable lighting accessory 1 (set into a bracelet in this example) on the other hand to illuminate 2 herself and create the desired light conditions for the optimal picture quality. In one embodiment, the mobile device can be a mobile phone with a front and back camera. In other embodiments, the mobile device may also be a tablet, PC or a personal digital assistant of various formats, a digital camera, or any device having the capacity to take a photograph or video, including an iPhone, etc. Any equivalent modification or variation, i.e. replacing the iPhone with other mobile phones of different brands or replacing the iPhone with other electronic device, such as a tablet computer, laptop, desktop, PC or personal digital assistant according to the spirit of the present invention is to be also included within the scope of the present invention.

Figure 2:
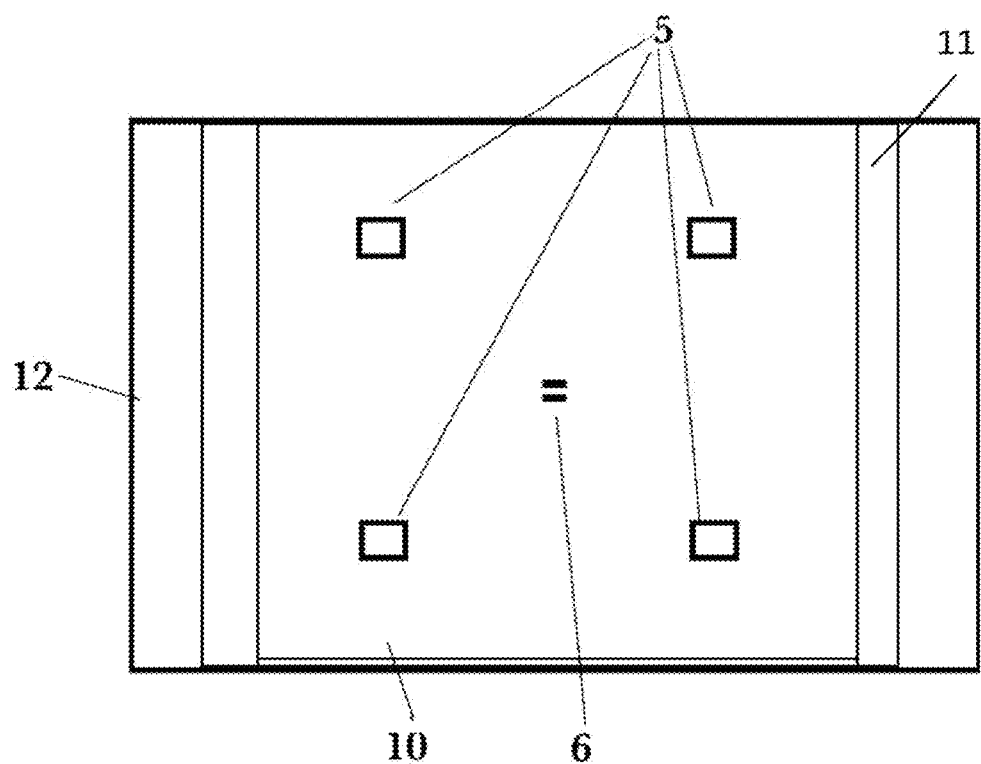
FIG. 2 is a top-view illustration of the wearable lighting accessory in accordance with various embodiments of the present invention.

In various embodiments and as shown in the top, interior-view illustration of FIG. 2, the wearable lighting accessory includes a light housing 12 for housing the various components as may be necessary to provide the lighting features described herein. The light housing 12 houses any electrical components as may be required to control the wearable lighting accessory and cause one or more lights 5 to illuminate, non-limiting examples of which include a printed circuit board (PCB) 10 or integrated circuit with associated electronics. A power source 11, such as a rechargeable lithium ion polymer battery, or any other battery or power source, is also housed by the light housing 12 and electrically connected with the PCB 10. Note that although the electrical components and power source 11 are described as being within the light housing 12, the invention is not intended to be limited thereto as the items can also be housed elsewhere so long as they are electrically and/or communicatively connected with the light source 5.

The lighting accessory 1 is designed to be very compact, but at the same time extremely powerful, comfortable and stylish. Importantly, the light housing 12 includes one or more lights 5. The one or more lights 5 are any suitable small component operable for selectively emitting a light with a sufficient lumens, intensity and a high angle to illuminate an object for photographic purposes. As a non-limiting example, desired lights 5 have width of less than 2 millimeters, a viewing angle greater than 130 degrees, and a lumens greater than 70. As a specific non-limiting example, a top surface of the PCB 10 includes four Cree XQ-D LEDs to operate as the one or more lights 5. Cree XQ-D LEDs are produced by Cree, located at 4600 Silicon Drive. Durham, N.C., 27703. Importantly, the one or more lights 5 include a sufficient number of lights (e.g., four LEDs) to produce enough light quality and light diffusion incorporated in a small enough package that can be worn as an accessory (e.g., worn as a piece of jewelry, watch, bracelet, necklace pendant, etc.).

In various embodiments, the lighting accessory 1 incorporates the latest technology thermally conductive PCB for LED lights 5 which allow the LED lights 5 to be placed closer together in a more compact area. The thermally conductive PCB functions to manage the heat produced by the LED lights 5 allowing the LED lights 5 to be safely and reliably positioned in close proximity to one another and to a person in a manner that has not previously been possible in lights that are used in photographic or video image capture. For example, when the light is worn on the wrist and activated for an extended period of time, the LEDs would heat-up, but would not cause discomfort to the wearer as there would be a protective/heat absorbing layer between the accessory and/or internal components and the person's skin.

In various embodiments, the lights 5 (when more than one) are positioned proximate one another to provide an evenly distributed light. As a non-limiting example, the lights 5 are between one and forty millimeters away from one another on the PCB 10. Desirably, the lights 5 are between two and twenty millimeters away from one another and, more desirably, between three and fifteen millimeters away from one another. The close proximity of the LED lights 5 also functions to greatly reduce shadows as the illumination from the light is very evenly distributed and powerful. A specialized coating (e.g., silicone coating) can be optionally added or injected into the light housing 12 to encompass all the components within the light housing 12 to eliminate the heat from the lights 5 to the touch, making the light 5 comfortable to wear. The close proximity of the LED lights 5 essentially eliminates shadows in the light that is used to illuminate a subject. In prior art devices using LED lights 5, there are frequently shadows where the light produced by one LED stops and the light from the next LED begins. This difficulty with shadows was further magnified by the fact that the LED lights in prior devices had to be spaced widely apart to manage the heat produced by the LED lights. The arrangement of the LED lights 5 in the current invention eliminates these difficulties and produces an essentially shadow free illumination of a subject. Moreover, when the lights 5 are placed in a tighter formation, the resulting unit is smaller and more easily incorporated into or concealed within a multitude of accessories.

The preferable one or more lights 5 are revolutionary in their low-cost and high power. They deliver lighting class reliability, a low thermal resistance and a wider spread of light (over 145 degrees) than typical plastic packages. The LED lights' 5 innovative wide light emission improves the omnidirectionality as desired for photography. The desired one or more lights 5 are flicker free, allowing the light to be used in both photo and video applications. The shape provides for a wide angle of light illumination. The full lighting can even be achieved when the subject is at relatively close distances to the camera. While based on current technology the use of LED lights 5 is preferable, the present invention is not limited to only LED lights, and is intended to provide for the incorporation of any and all lighting products and sources that by their nature or design could be used in the portable photographic lighting system claimed.

The power provided to the LED lights 5 in one embodiment is also dimmable. The changing or dimming of the power output has a commensurate dimming or changing of the light output from the LED lights 5. This change in the output of the LED lights 5 is accomplished with virtually no color shift, which cannot be achieved with most other LED light sources. Thus, the illumination from the lights 5 and its position can be varied and modified depending on the preferences and/or needs of the user.

In various embodiments, the wearable lighting accessory also includes a charge status indicator 6 (e.g., standard red and green LEDs) which serves to notify the user of the charge status of the power source 11. As a non-limiting example, the charge status indicator 6 is connected with the top surface of the PCB 10. In various embodiments, the PCB 10 (e.g., bottom or reverse surface) also contains a standard battery charge management integrated circuit (IC) and all relevant passive components for charge management and limiting current to the LEDs (i.e., lights 5).

Figure 3:
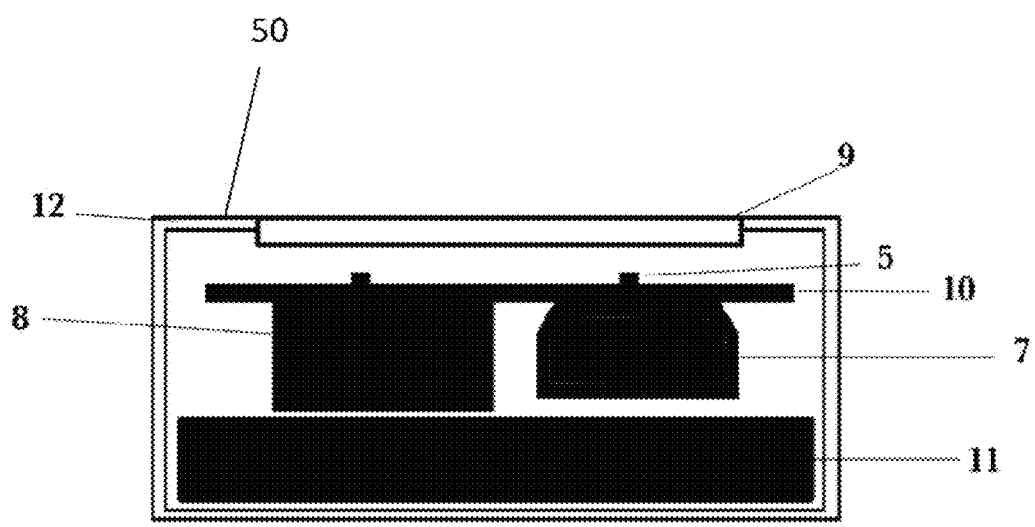
FIG. 3 is a side, interior-view illustration of the wearable lighting accessory in accordance with various embodiments of the present invention.

For further understanding, FIG. 3 provides a side, interior view of the light housing 12. To charge the power source 11, a port 7 (e.g., USB micro-b port, or any other port configuration) attaches to the PCB 10 (e.g., on the bottom surface of the PCB 10, or at any other suitable location) and is connected through the charge management IC in accordance with the IC's specifications. For example, a micro universal serial bus (USB) port 7 can be disposed on the unit for connecting the wearable lighting accessory 1 to an external power source to charge the lithium ion battery (i.e. internal power source 11) used for supplying power to the wearable lighting accessory 1. In one embodiment, the external power source may be a power bank, a direct current source, or an alternate current source. Thus, in various embodiments, the power source 11 is a rechargeable battery, charged using a micro USB port 7. The LED lights 5 are set into a PCB board 10 which is connected to the battery with associated circuitry. In other embodiments, the power source 11 can be recharged wirelessly using various wireless charging technologies as known to those skilled in the art. In yet other embodiments, the power source 11 can be charged with a solar cell that is attached to the device or via a microgenerator that charges the device with motion as provided by the user (such as while walking).

Figure 4:
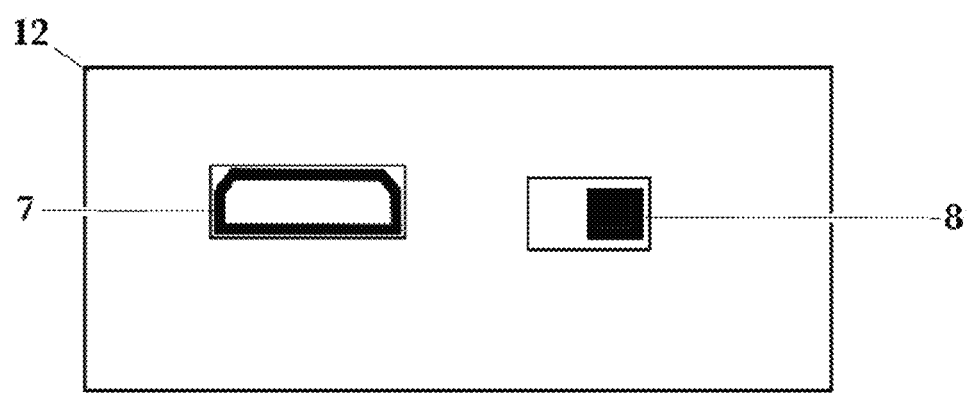
FIG. 4 is a side-view illustration of the wearable lighting accessory in accordance with various embodiments of the present invention.

An activation switch 8 is included that is of any form and in any suitable manner to allow a user to selectively activate the lights 5. As a non-limiting example, the activation switch 8 is a user activated slide switch that connects in series between the power source 11 and the lights 5 (e.g., Cree LEDs). In other embodiments, the activation switch 8 can be a switch, button or wheel (or any combination thereof), which could also control the dimming, to switch the light on and off, as well as providing means to dim or increase or decrease the level of light produced until the desired light conditions are created. The side-view illustration of FIG. 4 clearly shows an example of the activation switch 8 and port 7 as accessible from external surface of the light housing 12.

Finally, and referring again to FIG. 3, a translucent diffusion lens 9 is desirably included on the light emitting side 50 of the light housing 12 to diffuse the light output from the one or more lights 5 and reduce hot spots. Since proper illumination is critical for obtaining superior quality in photography and videography, although mobile devices now allow user image processing immediately after a photo is taken, such post processing still cannot modify the original lighting conditions. Proper illumination is achieved, for example, with the use of four LED lights 5 as covered with the light diffusion lens 9.

As a non-limiting example, the diffusion lens 9 is a translucent plastic or glass plate that attaches to the top of the light housing 12, sealing the components within the housing 12 and diffusing the light output from the lights 5. As understood by those skilled in the art, the diffusion lens 9 can be desirably formed to reduce shadow and/or glare.

In another aspect, the light housing 12 is optionally designed so that the heat generated by the power source 11 (e.g., lithium ion battery) and/or the lights 5 (e.g., LED lights) is dissipated. Thus, in addition to the light diffusing cover (i.e., diffusion lens 9), there is a heat-resistant cover over the entire unit, with the exception of the light emitting side with the lights (i.e., where the diffusion lens 9 resides). The heat-resistant cover is, for example, a plastic coating that coats the light housing 12.

Figure 5:
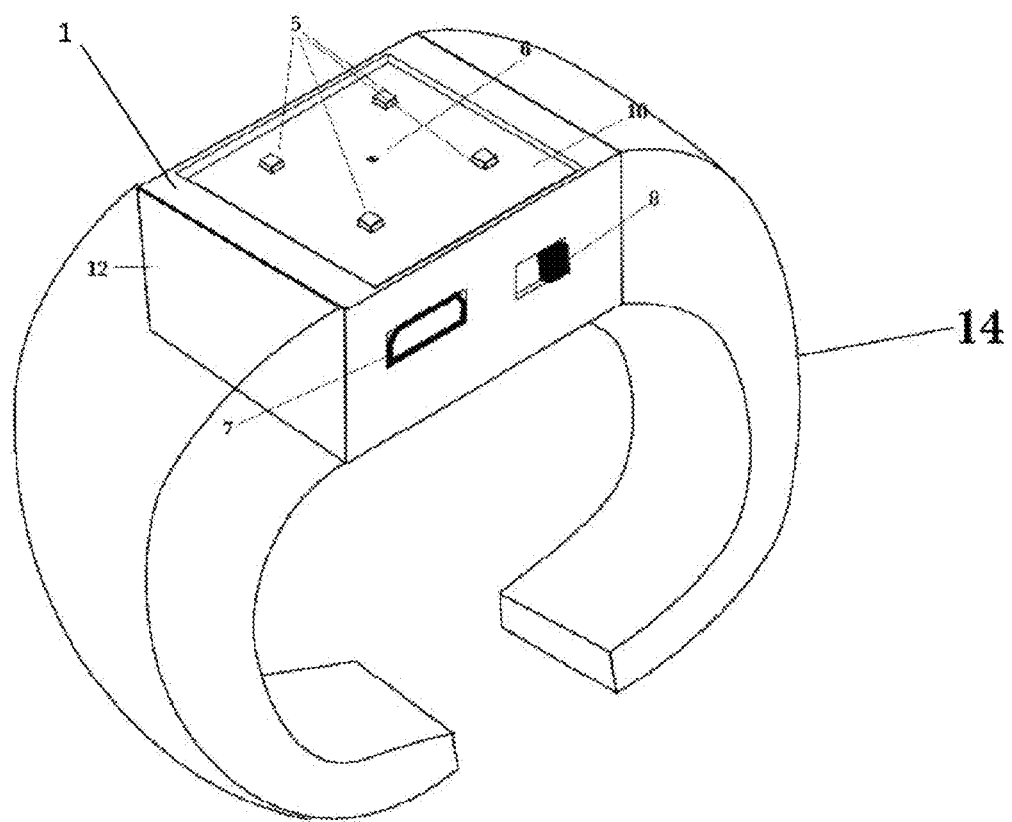
FIG. 5 is a perspective-view illustration of a bracelet serving as one form of jewelry into which the wearable lighting accessory could be set in accordance with various embodiments of the present invention.

As noted above and as shown in FIG. 5, the wearable lighting accessory 1 can be incorporated into a variety of devices to allow a user to easily wear and then activate the one or more lights 5. In the non-limiting example as shown in FIG. 5, the light housing 12 is incorporated into (e.g., attached with) the wrist bands 14 of a bracelet (or watch, etc.). Thus, according to an embodiment of the present invention, the wearable lighting accessory 1 includes a jewelry component and a light component designed to be worn comfortably and continuously. For example, the light housing 12 can be formed such that the wrist bands 14 are mere extensions of the housing 12 and, as a result, are attached to the light housing 12. In another non-limiting example, the light housing 12 can be glued, welded, screwed, and/or otherwise attached using any suitable attachment means to attach the housing 12 with the separately formed bracelet bands 14. It is noted that although present, the diffusion lens is removed from the illustration to depict the PCB 10, lights 5 and charge status indicator 6 as positioned beneath the diffusion lens. Thus, and as can be appreciated by those skilled in the art, a user can easily charge the power source as desired using the port 7 or activate the activation switch 8 to illuminate the user.

Figure 6:
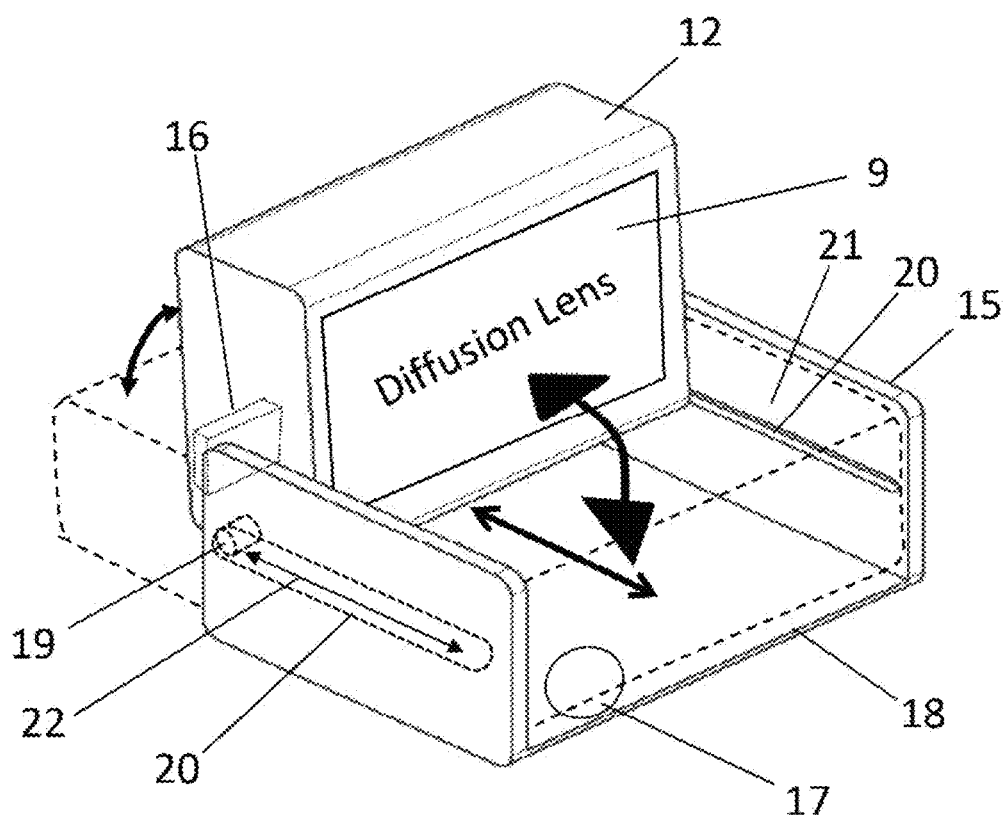
FIG. 6 is a perspective-view illustration of a configuration in which the light housing can be flipped over to expose or conceal the diffusion lens in accordance with various embodiments of the present invention.

It should be noted that the light housing 12 can be formed or otherwise incorporated into a variety of components that allow for concealment and selective exposure of the diffusion lens and lighting function of the lighting accessory. For example, and as depicted in FIG. 6, another embodiment of the present invention involves combining the light housing 12 with a novel casing assembly 15 that allows a user to selectively conceal and expose the diffusion lens 9 between a concealed configuration and an exposed configuration. As a non-limiting example, the light housing 12 is movably incorporated into a casing assembly 15. Inside the light housing 12, positioned near the wall opposite the diffusion lens 9, is a magnetic reed switch 16. In this non-limiting example, the magnet reed switch 16 serves as the activation switch (as referenced above). A magnet 17 is positioned within the cradle portion 18 of the casing assembly 15. The light housing 12 can be moved out of the casing assembly 15 and inverted, positioning the light emitting side (i.e., diffusion lens 9 or lights 5) so that it faces outward, and re-inserted into the casing assembly 15 with the lights 5 exposed (i.e., the exposed configuration with the light emitting side facing the user). Once inverted, the magnet(s) 17 will both hold the light housing 12 in position (i.e., the light housing 12 can be made of metal) and simultaneously actuate (e.g., close the circuit) the magnetic reed switch 16, thereby turning on the lights 5. Once the need for lighting has concluded, the process can be reversed, with the light housing 12 being slid out and inverted, turning off the lights 5 and returning the lighting component (i.e., diffusion lens 9) to its hidden position with the diffusion lens 9 facing the cradle portion 19 of the casing assembly (i.e., the concealed configuration).

In additional alternative embodiments, the magnetic reed switch 16 can be replaced with other physical, electronic or magnet switch means for turning on the lighting components of the light accessory 1 when moved into the exposed (outward) configuration with a light emitting side face a user. The use of the novel reversible mechanism as described herein is not limited to the light housing 12 and can be used in another embodiment to conceal other electronic devices, such as wearable fitness monitors.

It should be noted that there are a number of configurations by which the light housing 12 can be attached with the casing assembly 15 to allow a user to selectively reverse the position of the light housing 12 between the exposed and concealed configurations to selectively expose or conceal the light emitting side (and the diffusion lens 9). For example, the light housing 12 can simply be lifted out and removed from the casing assembly 15, flipped over, and then simply placed back into or otherwise affixed with the casing assembly 15. As another non-limiting example and as depicted in FIG. 6, a pin 19 can be formed or otherwise affixed with each of the sides of the light housing 12 to protrude from the sides of the light housing 12. The pins 19 then slideably reside within slots 20 formed within interior walls 21 of the casing assembly 15 that straddle the light housing 12. Thus and as depicted, a user can easily rotate up the light housing 12 and slide 22 the pins 19 within the slots 20 to selectively rest the light housing 12 within the casing assembly 15 in a manner that either exposes or conceals the diffusion lens 9.

Figures 7A, 7B:
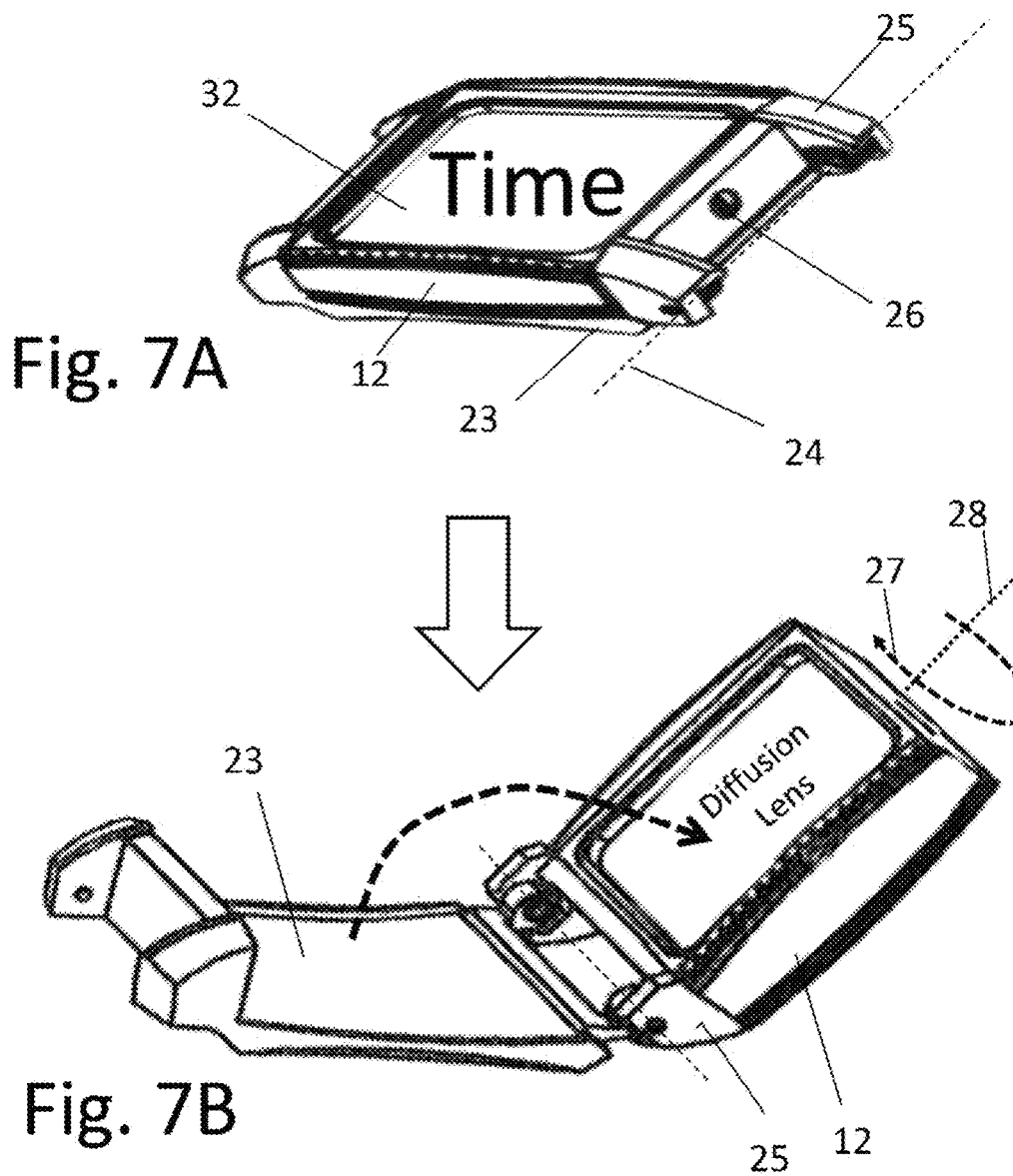
FIG. 7A is an illustration depicting the wearable lighting accessory as being incorporated into a watch-style accessory, depicting a watch face side in an exposed position.
FIG. 7B is an illustration depicting the watch-style accessory as being flipped up to expose a diffusion lens side.
Figure 7C:
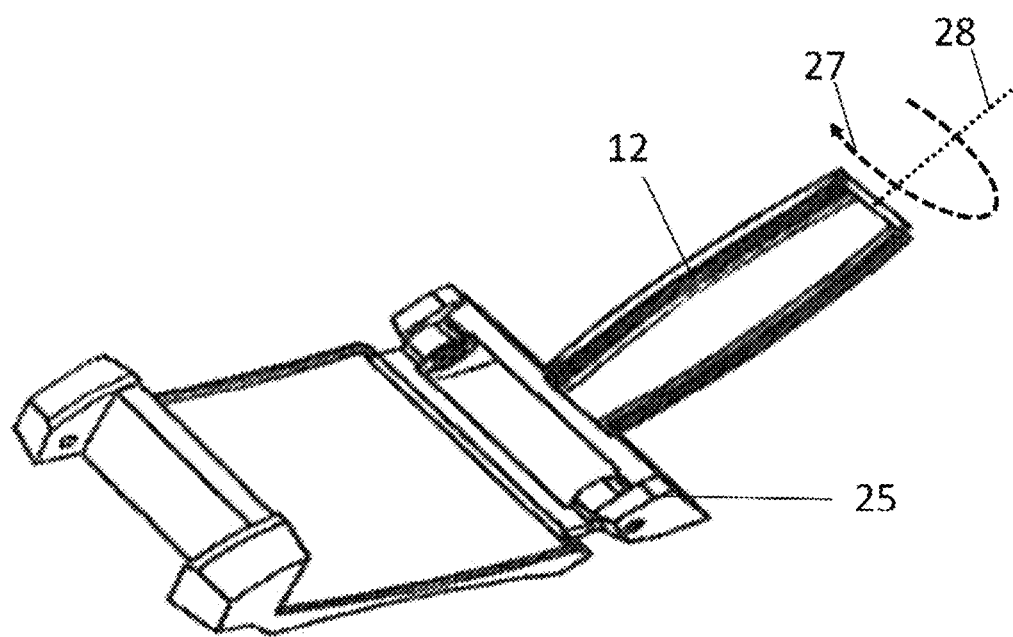
FIG. 7C is an illustration depicting the watch-style accessory as being spun about an axis.
Figure 7D:
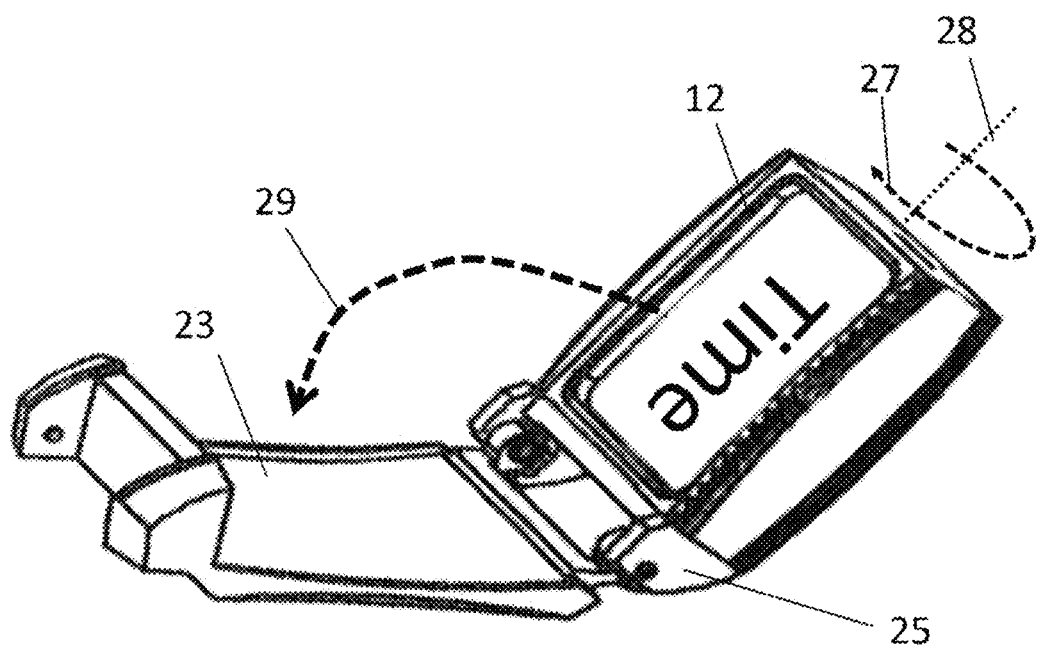
FIG. 7D is an illustration depicting the watch-style accessory as have been spun to show the watch face side in position for closure.
Figure 7E:
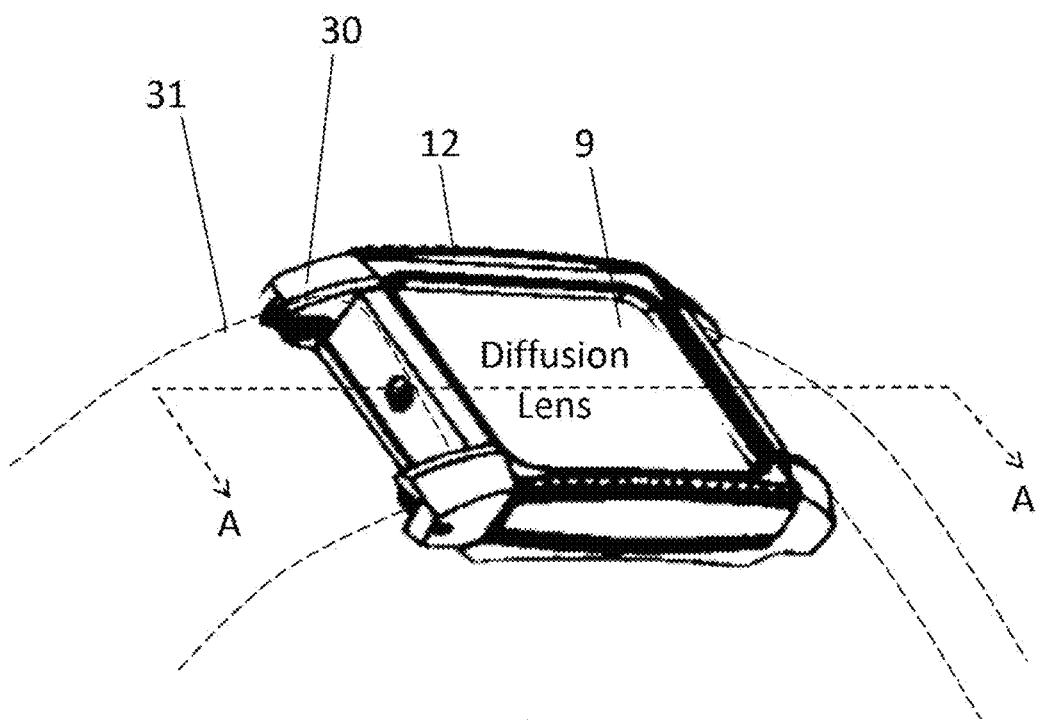
FIG. 7E is an illustration depicting the watch-style accessory as being flipped down to conceal the watch face side and position the diffusion lens side in the exposed position.
Figure 8:
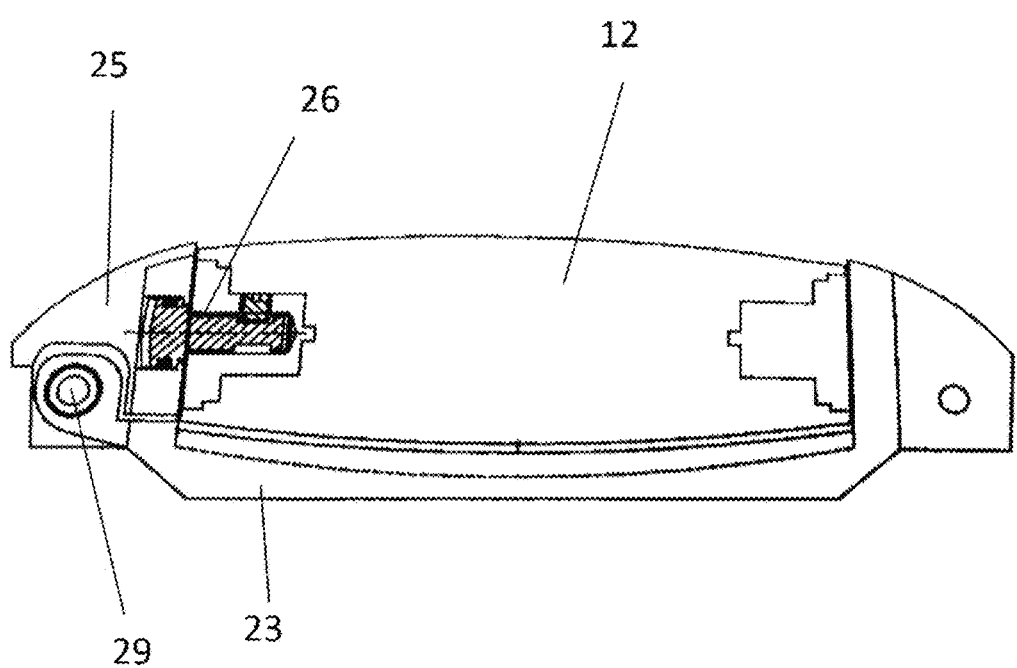
FIG. 8 is a cross-sectional view illustration of the watch-style accessory, taken from line A-A of FIG. 7E.

As noted above, the light housing 12 can be formed or otherwise incorporated into a variety of components that allow for concealment and selective exposure of the diffusion lens and lighting function of the lighting accessory. For example, and as depicted in FIGS. 7A through 7E, the light housing 12 can be rotatably connected 26 (e.g., rotating hinge) with a pivot bracket 25 that is in turn rotatably connected (e.g., hingedly connected) with the casing assembly 23. Thus, in this aspect, the light housing 12 and attached pivot bracket 25 can pivot up and away from the casing assembly 23 about a first pivot axis 24. Once pivoted up and as shown in FIGS. 7B through 7D, the light housing 12 can then spin 27 about a second pivot axis 28 with respect to the pivot bracket 25 to flip around the light housing 12. Once spun around into the desired configuration, the light housing 12 and attached pivot bracket 25 can then be pivoted 29 back toward the casing assembly 23 as shown in FIG. 7D, leaving the light housing 12 in an exposed configuration as shown in FIG. 7E. Thus, in the exposed configuration, the diffusion lens 9 is exposed for use. Alternatively, and as shown in the concealed configuration of FIG. 7A, the diffusion lens is concealed and rests against the casing assembly 23 or other component so long as the diffusion lens is concealed. For further understanding, FIG. 8 provides a cross-sectional view of the device as taken from line A-A of FIG. 7E. As shown, the light housing 12 is rotatably connected 26 (e.g., rotating hinge) with a pivot bracket 25 that is in turn rotatably connected 29 (e.g., hingedly connected) with the casing assembly 23.

Also as noted above, the light housing 12 can be incorporated into any desired device to provide an array of secondary functionalities. As a non-limiting example and as shown in FIGS. 7A through 7E, the light housing 12 can be incorporated into a watch-style accessory or any other wearable accessory. In this example, the light housing 12 has two sides. One side includes the light emitting side (e.g., diffusion lens 9 and/or lights 5) as shown in FIG. 7E. The other side and as shown in FIG. 7A includes a secondary function side (e.g., watch face, digital screen, etc.), or any other element as may be necessary to convey the time and/or any other desired secondary function (e.g., such as housing a Fit Bit or any other device). As described herein, the wearable lighting accessory includes a concealable light emitting side and a secondary function side. The secondary function is any function as may be desired. For example, the secondary function side can simply be a decorative jewelry plate or face. As yet another example, the secondary function side can include a cavity or clip to hold a Fit Bit or other wearable accessory.

Thus, in this aspect and other various aspects, the light housing 12 includes all of the necessary components, electronics, shape, or form as may be necessary to also provide a secondary function (e.g., operate as a watch or house a Fit Bit or hold a decorative jewelry plate, or any other device, etc.). It is noted that the casing assembly 23 can also operate as the wrist band (e.g., watch band or jewelry band) or, as shown in FIG. 7E, operate as the watch lug upon 30 with which the wrist band 31 of the wrist accessory can be connected. Thus, in this and other various aspects, a user can selectively position the light housing 12 in a concealed configuration (as shown in FIG. 7A) in which the diffusion lens 9 faces the casing assembly 23 and the secondary function side 32 (e.g., the watch face) is exposed to the user. Alternatively, the user can position the light housing 12 in an exposed configuration (as shown in FIG. 7E) in which the diffusion lens 9 is exposed to allow a user to illuminate themselves or other objects. The light housing 12 can be formed to activate the lights using any desired activation switch in accordance with the various embodiments of the present invention. For example, the lights in the light housing 12 can be activated with an activation switch that is manually activated (such as a via button or slide switch) or automatically activated (such as via a magnet reed switch as described above).

Figure 9:
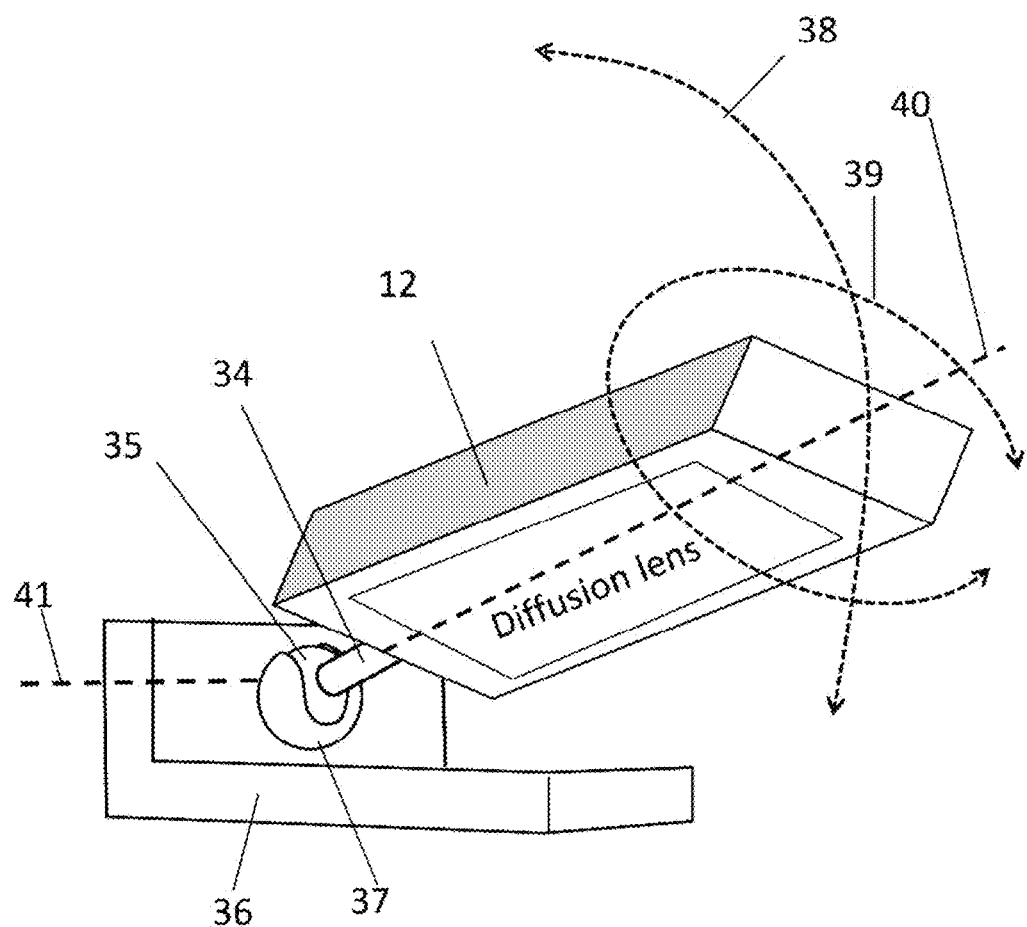
FIG. 9 is an illustration depicting a mechanism that provides for two-axes of rotation in accordance with various embodiments of the present invention.

Thus, given the description above and figures submitted herewith, it is clear that there are a number of configurations in which the user can selectively alter the configuration of the light housing 12. Yet another non-limiting example is depicted in FIG. 9, in which the light housing 12 includes a shaft 34 with a ball 35 protruding therefrom. The casing assembly 36 in this example includes a limiting socket 37 in which the ball 35 resides. Thus, the limiting socket 37 allows a user to selectively lift up 38 and rotate 39 the light housing 12 about two axes of rotation 40 and 41 and thereby selectively position the light housing 12 between the concealed and exposed configurations.

As noted above, the wearable lighting accessory can be configured to have a variety of features and functions. Additional non-limiting examples of suitable features are as follows. For example, the device can be formed with an ability to turn on and off the device by tapping the diffusion lens using touch technology as known to those skilled in the art. A further embodiment could be a voice recognition mechanism to control the on/off and light intensity features. In yet another aspect, the diffusion lens can be tapped again to adjust the intensity of the LED's. A further embodiment could be a miniature power supply that would drop the nominal battery to the nominal LED voltage, saving battery life. A further embodiment would be the use of LED's of different light intensity and different color to produce variations in intensity and color. A further embodiment would be to control LED's of different color for light effect. A further embodiment would be to cause the LED's to be blinked or to breathe to reduce draw on the battery and to reduce heat emission. A further embodiment would be to include a microphone to facilitate the intensity and/or color with the beat of the surrounding sound. A further embodiment would be to have the electronic component be entirely removable and/or replaceable. A further embodiment would be to have the wrist bands of the casing assembly be removable, replaceable and interchangeable. A further embodiment would be to have the light housing be water-resistant. A further embodiment would be to have the light housing be water proof to a depth of fifty (50) feet. A further embodiment would be for the light housing to be made of scratch-resistant material. It should be noted that the wearable lighting accessory as described herein can be formed to include all of the necessary components as may be required to provide for the features and functions as described herein, or any combination thereof as may be desired.

It should also be understood that, although the portable light device invention discussed above is described as being used in connection with providing lighting for use with photographic and video cameras, the portable lights provided for in the present invention may be used for producing light for any activity or purpose where improved or additional illumination is required, including but not limited to evening or nighttime activities, camping or hiking. It is further understood that the source of light for the portable lighting device invention is not limited to only LED lights, but rather is intended to provide for the incorporation of any and all light sources that by their nature or design could be used in the portable lighting systems such as those that are claimed herein. Additionally, it should be understood that source of power for the portable lighting device invention is not limited to only lithium ion batteries, but rather is intended to include batteries, power cells or other portable power sources of any nature that can be used in the portable lighting systems such as those that are claimed herein, and it is further intended that any such power sources for the present invention that are sufficiently potent could be used to provide power or charges for other electronic devices or components, including mobile phones.

As a result, to sum up, a novel attachable and wearable lighting accessory has been provided in the present invention for being adapted to different mobile electronic devices and for increasing luminance when the mobile electronic device is used in a low light environment. The novel light housing can conceal the lighting accessory and/or virtually any type of wearable technology, such as wearable fitness monitors, etc. Thus, the light housing is selectively reversible to have light emitting side (i.e., to emit light when used for photography) and a secondary function side (e.g., watch face, decorative jewelry plate, house a wearable component (e.g., Fit Bit, etc.), etc.).

The proposed invention is fully described abovementioned but not limited thereto. It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

Finally, while this invention has been described in terms of several embodiments, one of ordinary skill in the art will readily recognize that the invention may have other applications in other environments. It should be noted that many embodiments and implementations are possible and that all of the relevant features and/or components as listed herein can be combined or interchanged with one another as desired. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A wearable lighting accessory, comprising:
a light housing having a light emitting side;
one or more lights housed within the light housing;
electrical components electrically connected with the one or more lights to activate the one or more lights;
a power source attached with the electrical components; and
an activation switch attached with the light housing and operable for allowing a user to selectively activate the one or more lights;
a diffusion lens attached with the light emitting side of the light housing and positioned proximate the one or more lights such that light emitted from the one or more lights passes through the diffusion lens;
one or more wrist bands connected with the light housing;
a casing assembly for holding the light housing, the casing assembly positioned between the light housing and the one or more wrist bands, and wherein the light housing is movably connected with the casing assembly such that the light housing can be positioned between a concealed configuration in which the light emitting side of the light housing is concealed and an exposed configuration in which the light emitting side is exposed to emit light from the one or more lights; and
wherein the casing assembly includes a cradle portion with a magnet connected with the cradle portion, and wherein the activation switch is a magnet switch positioned within the light housing such that when the light housing is in the exposed position, the magnet switch is positioned proximate the magnet in the cradle portion to actuate the magnet switch and activate the one or more lights.

2. The wearable light accessory as set forth in claim 1, wherein the light housing includes components to provide a secondary function as viewable from a secondary function side of the light housing, such that when in the concealed configuration, the secondary function side is exposed and the light emitting side is concealed, and when in the exposed configuration, the light emitting side is exposed and the secondary function side is concealed.

3. The wearable light accessory as set forth in claim 2, wherein the secondary function is a watch such that the secondary function side includes a watch face.

4. The wearable light accessory as set forth in claim 3, wherein the one or more lights comprise four light emitting diodes (LED).

5. The wearable light accessory as set forth in claim 4, wherein the light housing includes sides with pins protruding therefrom, and wherein the casing assembly includes interior walls with slots formed therein, such that the pins of the light housing slideably reside within the slots of the casing assembly, whereby a user can rotate up the light housing and slide the pins within the slots to selectively rest the light housing within the casing assembly in either the concealed or exposed configurations.

6. The wearable light accessory as set forth in claim 4, further comprising a pivot bracket positioned between the light housing and casing assembly, such that the light housing is rotatably connected with the pivot bracket, and the pivot bracket is rotatably connected with the casing assembly, whereby a user can pivot the pivot bracket and light housing up and away from the casing assembly about a first pivot axis, and then spin the light housing about a second pivot axis into a desired configuration, at which point the light housing and pivot bracket can be pivoted back toward the casing assembly, allowing a user to selectively position the light housing between the concealed and exposed configurations.

7. A wearable lighting accessory, comprising:
a light housing having a light emitting side;
one or more lights housed within the light housing;
electrical components electrically connected with the one or more lights to activate the one or more lights;
a power source attached with the electrical components; and
an activation switch attached with the light housing and operable for allowing a user to selectively activate the one or more lights;
a casing assembly for holding the light housing, wherein the light housing is movably connected with the casing assembly such that the light housing can be positioned between a concealed configuration in which the light emitting side of the light housing is concealed and an exposed configuration in which the light emitting side is exposed to emit light from the one or more lights; and
wherein the casing assembly includes a cradle portion with a magnet connected with the cradle portion, and wherein the activation switch is a magnet switch positioned within the light housing such that when the light housing is in the exposed position, the magnet switch is positioned proximate the magnet in the cradle portion to actuate the magnet switch and activate the one or more lights.

8. A wearable lighting accessory, comprising:
a light housing having a light emitting side;
one or more lights housed within the light housing;
electrical components electrically connected with the one or more lights to activate the one or more lights;
a power source attached with the electrical components; and
an activation switch attached with the light housing and operable for allowing a user to selectively activate the one or more lights;
a casing assembly for holding the light housing, wherein the light housing is movably connected with the casing assembly such that the light housing can be positioned between a concealed configuration in which the light emitting side of the light housing is concealed and an exposed configuration in which the light emitting side is exposed to emit light from the one or more lights; and
wherein the light housing includes sides with pins protruding therefrom, and wherein the casing assembly includes interior walls with slots formed therein, such that the pins of the light housing slideably reside within the slots of the casing assembly, whereby a user can rotate up the light housing and slide the pins within the slots to selectively rest the light housing within the casing assembly in either the concealed or exposed configurations.

9. A wearable lighting accessory, comprising:
a light housing having a light emitting side;
one or more lights housed within the light housing;
electrical components electrically connected with the one or more lights to activate the one or more lights;
a power source attached with the electrical components; and
an activation switch attached with the light housing and operable for allowing a user to selectively activate the one or more lights;
a casing assembly for holding the light housing, wherein the light housing is movably connected with the casing assembly such that the light housing can be positioned between a concealed configuration in which the light emitting side of the light housing is concealed and an exposed configuration in which the light emitting side is exposed to emit light from the one or more lights; and
a pivot bracket positioned between the light housing and casing assembly, such that the light housing is rotatably connected with the pivot bracket, and the pivot bracket is rotatably connected with the casing assembly, whereby a user can pivot the pivot bracket and light housing up and away from the casing assembly about a first pivot axis, and then spin the light housing about a second pivot axis into a desired configuration, at which point the light housing and pivot bracket can be pivoted back toward the casing assembly, allowing a user to selectively position the light housing between the concealed and exposed configurations.

10. A wearable lighting accessory, comprising:
a light housing having a light emitting side;
one or more lights housed within the light housing;
electrical components electrically connected with the one or more lights to activate the one or more lights;
a power source attached with the electrical components;
an activation switch attached with the light housing and operable for allowing a user to selectively activate the one or more lights; and
wherein the light housing can be positioned between a concealed configuration in which the light emitting side of the light housing is concealed and an exposed configuration in which the light emitting side is exposed, and wherein the light housing includes a secondary function side to provide a secondary function as viewable from the secondary function side of the light housing, such that when in the concealed configuration, the secondary function side is exposed and the light emitting side is concealed, and when in the exposed configuration, the light emitting side is exposed and the secondary function side is concealed.

11. The wearable light accessory as set forth in claim 10, wherein the secondary function is a watch such that the secondary function side includes a watch face.

\* \* \* \* \*